(12) United States Patent
Ishioka (10) Patent No.: US 6,999,422 B2
(45) Date of Patent: Feb. 14, 2006

(54) COMMUNICATION DEVICE

(75) Inventor: Yuzuru Ishioka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 922 days.

(21) Appl. No.: 09/845,883

(22) Filed: Apr. 30, 2001

(65) Prior Publication Data

US 2002/0071391 A1 Jun. 13, 2002

(30) Foreign Application Priority Data

Dec. 8, 2000 (JP) ............................. 2000-373829

(51) Int. Cl.
*H04L 12/26* (2006.01)
(52) U.S. Cl. ....................... 370/238; 370/249; 370/252
(58) Field of Classification Search ........ 370/229–238, 370/238.1, 248–249, 252; 709/224, 231, 709/239–241, 235
See application file for complete search history.

(56) References Cited

U.S. PATENT DOCUMENTS 6,269,082 B1 * 7/2001 Mawhinney et al. ........ 370/247
6,360,271 B1 * 3/2002 Schuster et al. ............ 709/231
6,650,621 B1 * 11/2003 Maki-Kullas ............... 370/238
6,798,742 B1 * 9/2004 Mawhinney et al. ........ 370/252

* cited by examiner

*Primary Examiner*—Steven Nguyen
(74) *Attorney, Agent, or Firm*—Katten Muchin Rosenman LLP (57) ABSTRACT

A communication device which efficiently transports packets through optimal routes. When there are two or more routes to reach a certain destination, a test packet generator generates a test packet for each route, one of them being designated as the reference test packet. A transmission time acquisition unit records the transmission time of each test packet, relative to that of the reference test packet. When a test packet is received, a reception time acquisition unit measures its reception time relative to the reception time of the reference test packet. Calculating the difference between the transmission and reception times and evaluating such difference values for all routes, a transport time evaluation unit ranks the routes in terms of their packet transport times. A packet transmitter selects an appropriate route from the ranked list of possible routes, and sends out packets to the selected route.

5 Claims, 7 Drawing Sheets

104 ⏜ TRANSIT/DESTINATION NODE LIST

| NO. | SOURCE NODE ID | ROUTE ID | TRANSIT NODE ID (1) | ... | TRANSIT NODE ID (N) | DESTINATION NODE ID | TRANSMIT PORT NO. | TEST CONTROL |
|---|---|---|---|---|---|---|---|---|
| (1) | N1 | #1 (ROUTE Ra) | N2(B) | ... | — | N4(D) | PORT1 | 1 |
| (2) | N1 | #2 (ROUTE Rb) | N3(C) | ... | — | N4(D) | PORT2 | 1 |

COMMUNICATION DEVICE

BACKGROUND OF THE INVENTION

1. Field of the Invention

The present invention relates to a communication device, and more particularly to a communication device which controls packet transmission.

2. Description of the Related Art

Recent years have seen increasing amounts of packet traffic because of the expanding use of the Internet. In today's Internet Protocol (IP) networks, the packets carry various types of information, from ordinary computer data to delay-sensitive realtime voice and video streams. To address the requirements for packet transport with smaller delays, a new traffic engineering protocol called "label switching" has been proposed. Label is a short fixed-length value that is attached to packets at the ingress node to specify a path to a particular destination. Without using ordinary layer-3 (network layer) routers, label-switched networks transport such labeled packets over a layer-2 path that is previously defined for each destination. That is, the label switching mechanism enables fast packet delivery by eliminating upper-layer routing procedures. This new technology, the Multiprotocol Label Switching (MPLS) protocol, is currently under standardization by the Internet Engineering Task Force (IETF).

Figure 7:
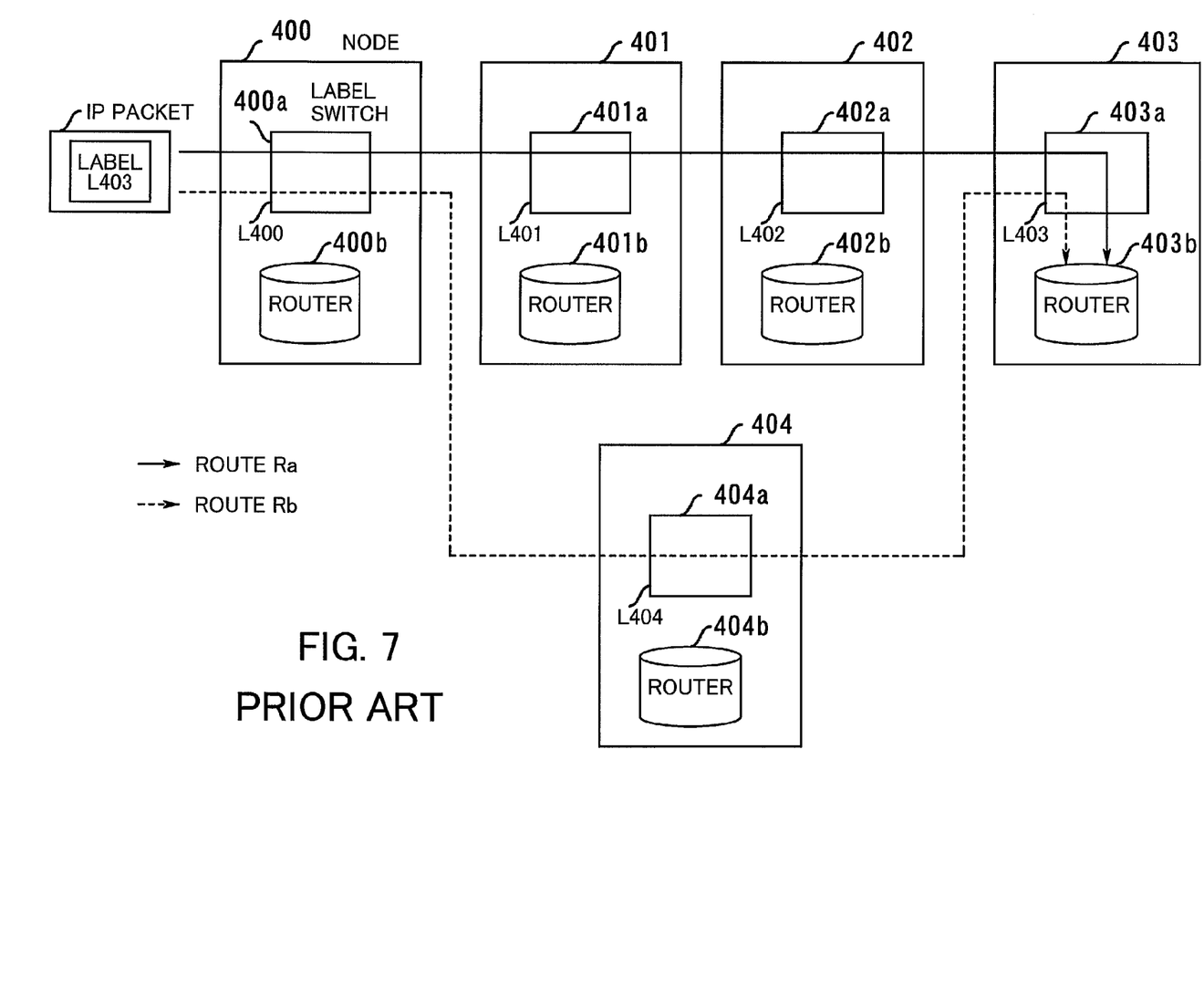
FIG. 7 shows a conventional way of transporting IP packets with label switching techniques.

FIG. 7 shows a conventional way of transporting IP packets with label switching techniques. In the network shown in FIG. 7, each network node 400 to 404 has a kind of hybrid configuration of a label switch part 400*a* to 404*a* and an ordinary router part 400*b* to 404*b*. The label switches 400*a* to 404*a* are designated by their unique identifiers L400 to L404, respectively. Notice that there are two routes RA and RB between two end nodes 400 and 403, the latter route being shorter than the former in terms of the number of intermediary nodes and links.

The basic function of the label switches 400*a* to 404*a* is to forward packets from source to destination by using label information. To this end, they receive an IP packet having a label and determine whether the identifier contained in the label field matches with the identifier of its own. If they agree with each other, the label switches 400*a* to 404*a* pass the received packets to their local router part 400*b* to 404*b*, removing the label from each packet. If not, the packets are forwarded to the next-hop link on their pre-established label-switched path.

Suppose, for example, that a label L403 is attached to an IP packet at the ingress node 400. This packet is transported through the label switches in the intermediary nodes, or transit nodes, until it finally reaches the egress node 403, where the packet is directed from the label switch 403*a* to the router 403*b*. In this way, label-switched networks deliver IP packets to their destinations without using layer-3 routing mechanisms, thus making faster transport of packets possible.

The above-described conventional way of label switching, however, lacks flexibility in its route selection functions. More specifically, the conventional label switching provides only a fixed set of label-switched paths being defined and stored in a routing table at each source end. The problem is that such packet routes registered in a routing table are not guaranteed to be the shortest or optimal ones, which sometimes causes inefficiency in the packet transport. In the example of FIG. 7, the second route RB is shorter than the first route RA. However, in the case where the routing table happens to include the route RA as the best route to take, the IP packets addressed to the node 403's domain will follow the route RA, spending more time than when the other route RB is taken.

SUMMARY OF THE INVENTION

Taking the above into consideration, an object of the present invention is to provide a communication device which efficiently transports packets through optimal routes.

To accomplish the above object, according to the present invention, there is provided a communication device which controls transmission of packets. This communication device comprises a transmission testing unit and a packet transmission unit. The transmission testing unit performs a packet route evaluation test to determine which route is appropriate for packet transport. To this end, the transmission testing unit comprises the following elements: a test packet generating unit which generates a plurality of test packets, one for each route reaching a given destination node, the plurality of test packets including one reference test packet; a transmission time acquisition unit which records the reference transmission time at which the reference test packet is transmitted, and measures the transmission times of the other test packets to be transmitted, relative to the reference transmission time; and a reception time acquisition unit which records reference reception time at which the reference test packet is received, and measures the reception times of the other received test packets, relative to the reference reception time; and a transport time evaluation unit which ranks the plurality of routes in the order of packet transport times thereof, by evaluating the difference between the transmission time and reception time of each test packet. The packet transmission unit transmits packets to one of the routes that is selected according to the result of the packet route evaluation test performed by the transmission testing unit.

The above and other objects, features and advantages of the present invention will become apparent from the following description when taken in conjunction with the accompanying drawings which illustrate preferred embodiments of the present invention by way of example.

DESCRIPTION OF THE PREFERRED EMBODIMENTS

Preferred embodiments of the present invention will be described below with reference to the accompanying drawings.

Figure 1:
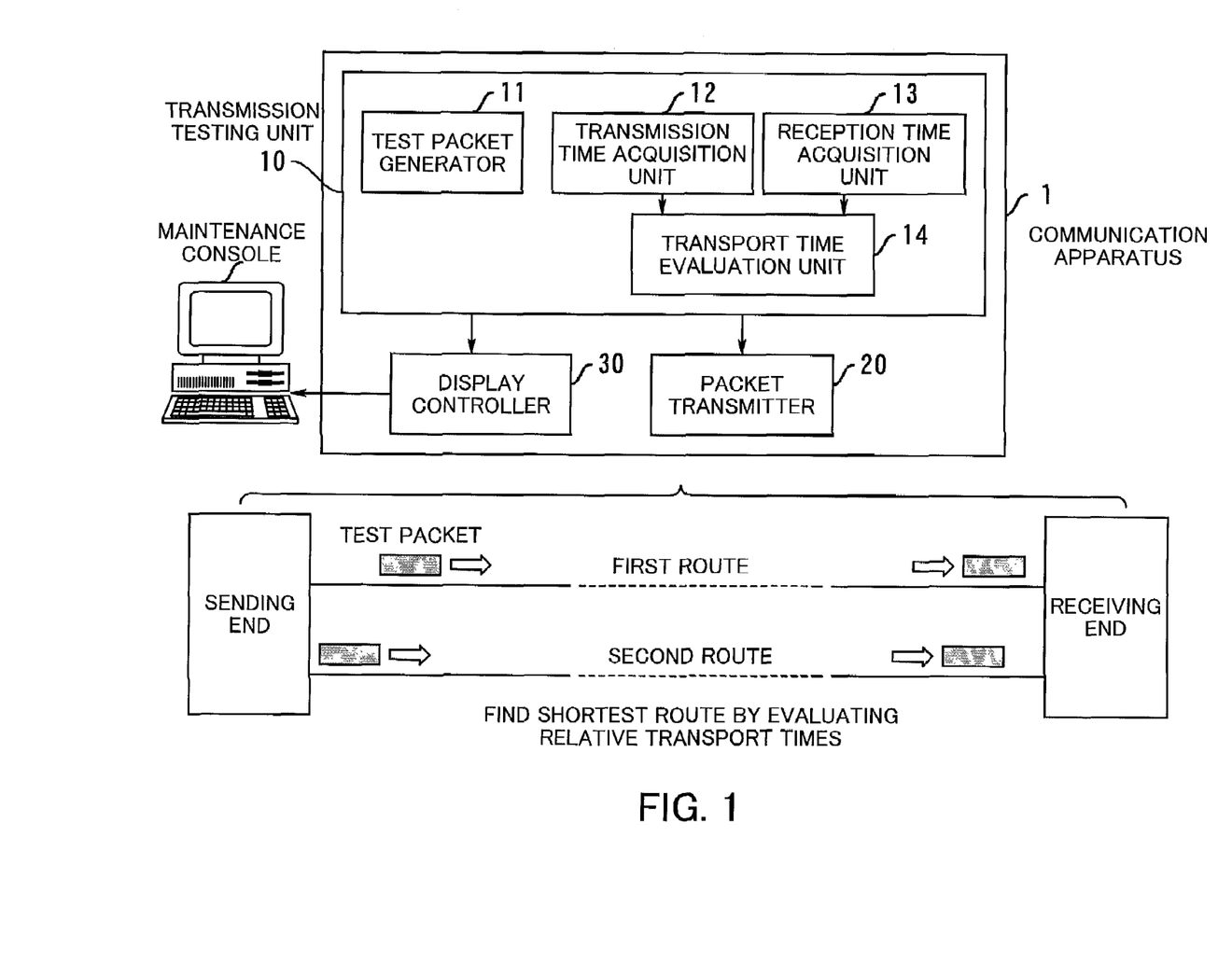
FIG. 1 is a conceptual view of a communication device according to the present invention.

FIG. 1 is a conceptual view of a communication device according to the present invention. This communication device 1 has the following elements: a transmission testing unit 10 which evaluates packet transport times of possible routes in an indirect way, a packet transmitter 20 which transmits IP packets, and a display controller 30 which visualizes the result of the packet route evaluation test conducted by the transmission testing unit 10.

When a specific source and destination nodes are given, and when there are two or more layer-2 connection paths between the two nodes, those paths must have different propagation delays depending on the length of their transmission lines, the number of transit nodes along them, and the forwarding delay at each transit node. Such propagation delays are referred to herein as the "packet transport times." By evaluating the packet transport time of each connection path, or route, the transmission testing unit 10 determines which one is faster. Taking the result of this evaluation test into consideration, the packet transmitter 20 chooses which route to use when it transmits IP packets.

The transmission testing unit 10 has the following elements: a test packet generator 11, a transmission time acquisition unit 12, a reception time acquisition unit 13, and a transport time evaluation unit 14. The test packet generator 11 generates a test packet for each route. That is, when there are a plurality (n) of routes to reach a destination, it produces n test packets. The transmission time acquisition unit 12 records when each test packet is transmitted, measuring the time with respect to a certain reference. More specifically, it uses one of the generated test packets as a "reference test packet." The transmission time of this packet is referred to as the "reference transmission time." The transmission time of a test packet is measured relative to this reference transmission time. The reception time acquisition unit 13, on the other hand, measures the reception time of those test packets including the reference test packet. The reception time of the reference test packet is referred to as the "reference reception time." The reception time of a test packet is measured relative to the reference reception time.

The transport time evaluation unit 14 calculates the difference between the transmission time and reception time of each test packet. Evaluating such difference values for all test packets, it ranks the plurality of routes in terms of their packet transport times. The packet transmitter 20 selects an appropriate route from the resultant ranked list of possible routes, and sends out given IP packets to the link on the selected route. The transmission testing unit 10 supplies its evaluation test result also to the display controller 30, allowing it to display the information on the monitor screen of a maintenance console that is attached to the communication device 1.

Figure 2:
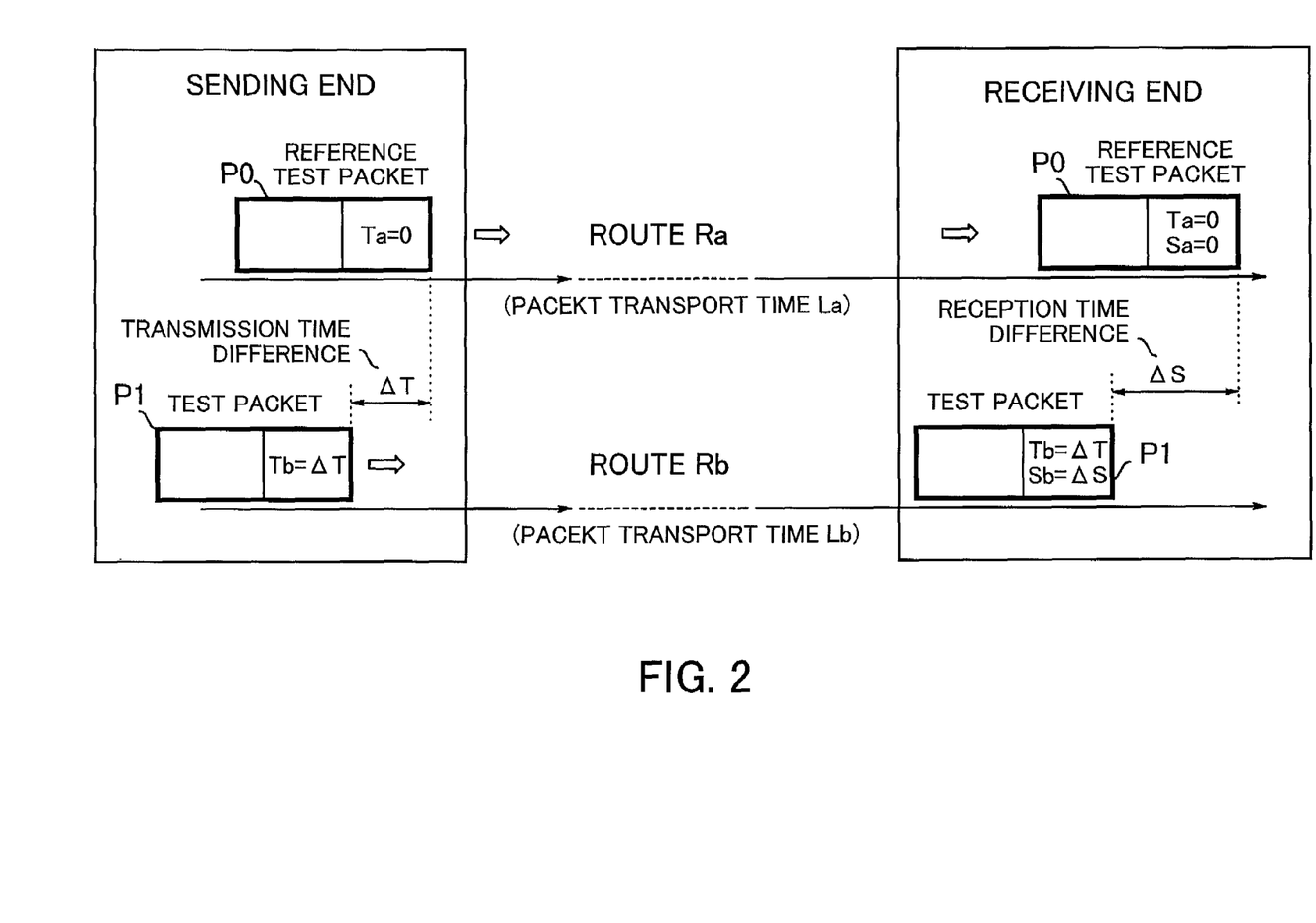
FIG. 2 explains how the communication device carries out a packet route evaluation test.

Referring next to FIG. 2, the next section provides more details about the packet route evaluation test of the present invention. FIG. 2 schematically shows how the test is conducted. As previously noted, the communication device 1 prepares as many test packets as the number of possible delivery routes. For simplicity, it is assumed here that there are two routes named Ra and Rb, and therefore, two test packets are produced. In the example of FIG. 2, the test packet for route Ra will be referred to as the reference test packet P0 (while the other packet is named P1). As will be described later, each test packet has some data fields for the purpose of correcting measured packet transport times. The proposed communication device 1 transmits such test packets P0 and P1 from the source (i.e., the communication device 1 itself) to the destination via different routes.

While the two test packets are sent out almost simultaneously, there must be a certain amount of time lag from the transmission of the reference test packet P0 to that of the test packet P1. To make it possible to compensate later for this lag, a transmission time counter (not shown) is started at the time when the reference test packet P0 is sent out. That is, the counter value is reset to zero when the reference test packet P0 is transmitted, and therefore the reference test packet P0 contains its own transmission time Ta being zero in its time correction data field. Suppose that the test packet P1 is then transmitted with a delay of $\Delta t$ after the reference test packet P0. The test packet P1 carries that delay Tb=$\Delta t$ in its time correction data field.

At the receiving end, a reception time counter (not shown) is activated when the first test packet arrives. In the case the first-arrived packet is the reference test packet, this zero-valued time record is referred to as the reference reception time Sa. This value Sa=0 is put into the time correction data field of the received test packet for later processing. When the next test packet is received, its reception time Sb is added to the time correction data field of the test packet P1. On the other hand, in the case where the test packet P1 comes first, the reception time Sb=0 is put into the time correction data field of the received test packet. Then the reference test packet P0 is received some time later. The reception time value Sa is put into the time correction data field of the received reference test packet P0, which is referred to as the reference reception time.

In the example of FIG. 2, the reference test packet P0 arrives first, and then the test packet P1 comes with a delay of $\Delta s$. As a result, the values Sa=0 and Sb=$\Delta s$ are set to the received packets P0 and P1, respectively.

Now, let La be the packet transport time of the reference test packet P0 travelling along the route Ra, and let Lb be that of the test packet P1 travelling along the other route Rb. Then the following relation holds.

$$Lb-La=(Sb-Sa)-(Tb-Ta)=\Delta s-\Delta t \qquad (1)$$

where $\Delta t$ is the transmission time difference (Tb−Ta), and $\Delta s$ is the reception time difference (Sb−Sa). This equation (1) suggests that the relationship between La and Lb can be determined by comparing the transmission time difference $\Delta t$ and reception time difference $\Delta s$. More specifically, if $\Delta s-\Delta t>0$, this means that the route Ra's packet transport time La is smaller than the route Rb's packet transport time Lb. If $\Delta s-\Delta t<0$, the route Ra's packet transport time La is greater than the route Rb's packet transport time Lb. In this way, according to the present invention, the relationship between the transport times La and Lb of different routes Ra and Rb can be deduced from the relationship between $\Delta s$ and $\Delta t$, without directly measuring La and Lb themselves. Further, according to the present invention, the above-described packet transmission test is conducted at regular intervals.

As already mentioned, the transmission test mechanism employs a transmission time counter and a reception time counter to measures the transmission time and reception time of test packets, respectively. Because the transmission time counter starts with an initial value of zero when the reference test packet is sent out, the reference transmission time Ta is always zero, meaning that the transmission time difference $\Delta t$ equals the measured transmission time Tb itself. In this sense, the transmission time counter measures the transmission time difference $\Delta t$; in other words, it measures the transmission time of a test packet relative to that of the reference test packet.

The reception time counter, on the other hand, starts with an initial value of zero when the first test packet is received, whether it is the reference test packet or not. The reference reception time, therefore, may not always zero, but will have a non-zero value in the case the other test packet P1 arrives before the reference test packet P0. In this case, the reception time difference Δs, or (Sb−Sa), exhibits a negative value, indicating that the test packet P0 has arrived earlier than the reference test packet P1.

The above section has discussed the case where there are only two routes Ra and Rb. The above-described algorithm, however, is not limited to this specific assumption, but can also be applied in an expanded manner to the networks having three or more paths to reach a single destination. Suppose, for example, that test packets P0, P1, and P2 are produced and transmitted over three different routes Ra, Rb, and Rc, respectively, the test packet P0 being the reference test packet. For the packet transport time Lc of the third route Rc, the following equation stands in this situation.

$$Lc-La=(Sc-Sa)-(Tc-Ta)=\Delta s1-\Delta t1 \qquad (2)$$

where $\Delta t1$ is the transmission time difference of the test packet P2 with respect to the reference transmission time Ta, and $\Delta s1$ is the reception time difference of P2 with respect to the reference reception time Sa. The equation (2) means that La is smaller than Lc when $\Delta s1-\Delta t1>0$, and La is greater than Lc when $\Delta s1-\Delta t1<0$.

Consider, for example, a case where the evaluation of equation (1) has yielded a relationship La>Lb, and that of equation (2) has revealed another relationship La<Lc. This means Lb<La<Lc as a whole, indicating that the three routes Rb, Ra, and Rc have successively longer transport times. For another example, suppose that the evaluation of equations (1) and (2) has yielded La<Lb and La>Lc, respectively. This means Lc<La<Lb as a whole, indicating that the three routes Rc, Ra, and Rb have successively longer transport times.

For still another example, consider that the evaluation of equations (1) and (2) has revealed La>Lb and La>Lc, respectively. This evaluation result raises a question about the ordinal relationship between Lc and Lb. The proposed transmission testing unit then calculates X=Lb−La, which equals (Δs−Δt), as well as X1=Lc−La, which equals (Δs1−Δt1). If X is greater than X1, it means Lb>Lc and hence Lc<Lb<La, indicating that the three routes Rc, Rb, and Ra need successively longer transport times. If X is smaller than X1, it means Lb<Lc and hence Lb<Lc<La, indicating that the three routes Rb, Rc, and Ra have successively longer transport times.

Yet another possible result of the evaluation of equations (1) and (2) may be a combination of La<Lb and La<Lc. In this case, the transmission testing unit calculates X=Lb−La (i.e., Δs−Δt) and X1=Lc−La (i.e., Δs1Δt1) and compares these values. If X is greater than X1, it means Lb>Lc and therefore La<Lc<Lb, indicating that the three routes Ra, Rc, and Rb have successively longer transport times. If X is smaller than X1, it means Lb<Lc and therefore La<Lb<Lc, indicating that the three routes Ra, Rb, and Rc have successively longer transport times. In this way, the transmission testing unit 10 ranks given three routes in terms of their packet transport times, the method being applicable also to the cases where four or more routes are available.

The next section will present a more detailed structure of the proposed system. In this system, the source node sends test packets each containing a transmission time record, relative to the reference transmission time, and at the destination node, those packets are immediately returned intact to the source node. The source node receives them and records their reception times relative to the reference reception time. This test packet loopback mechanism permits the source node to evaluate the round-trip transport time of each route, relative to the reference test packet timing, thus making it possible to rank the potential routes in terms of their transport times.

Figure 3:
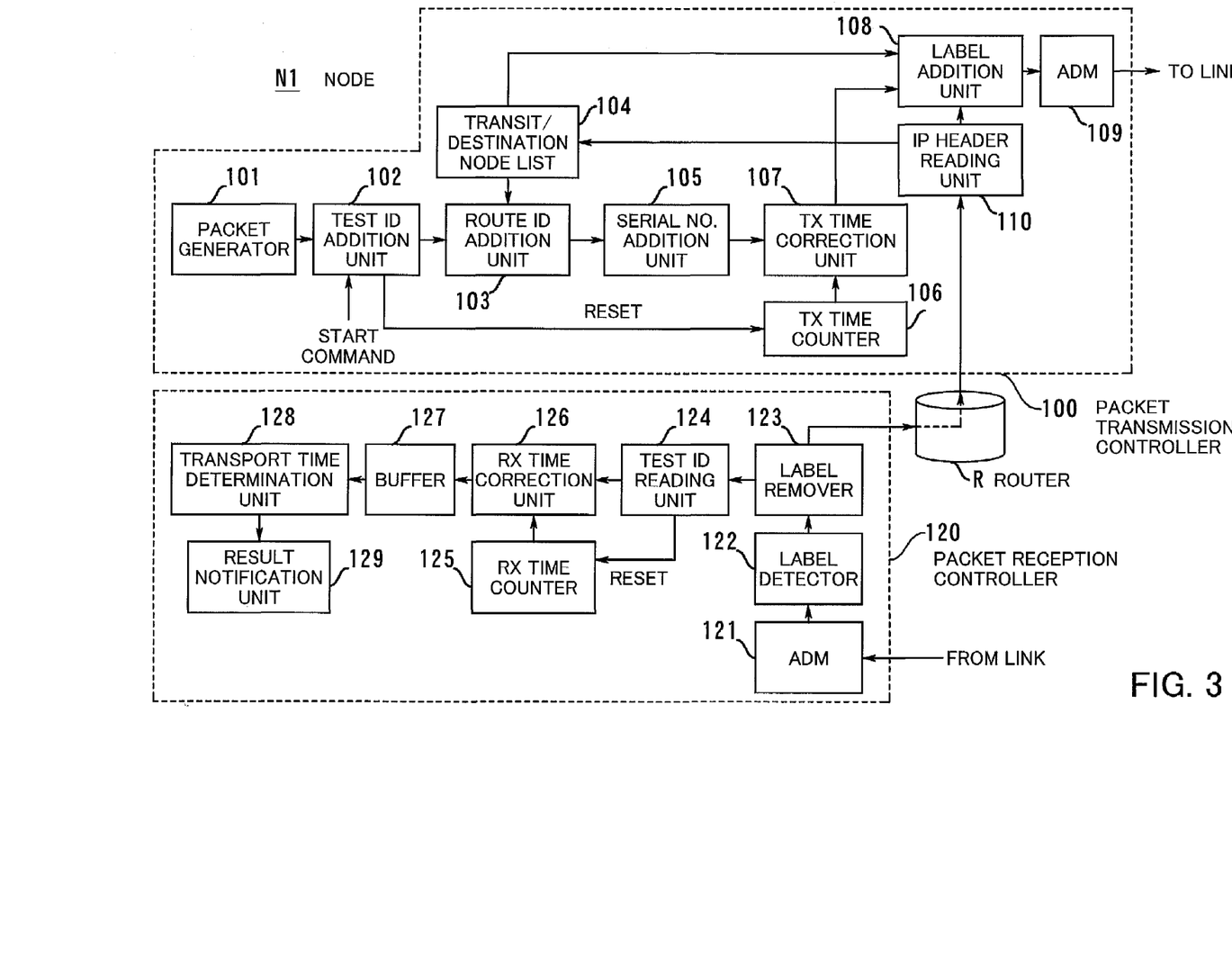
FIG. 3 shows the structure of a network node which initiates a test.

FIG. 3 shows the structure of a network node N1 which functions as an ingress node to which IP packets are entered for delivery. This node N1 comprises a router R, a packet transmission controller 100, and a packet reception controller 120. Referring to the upper half of FIG. 3, the packet transmission controller 100 has the following elements: a packet generator 101, a test ID addition unit 102, a route ID addition unit 103, a transit/destination node list 104, a serial number addition unit 105, a transmission (TX) time counter 106, a transmission time correction unit 107, a label addition unit 108, an add/drop multiplexer (ADM) 109, and an IP header reading unit 110.

The packet generator 101 generates test packets. The test ID addition unit 102 affixes a test ID to each test packet, based on a given test start signal. The test ID indicates the packet's identity as a test packet. The route ID addition unit 103 adds an appropriate route ID to the test packets, depending on the route they should take. The route ID addition unit 103 also adds transit node IDs and destination node ID to each test packet, as specified in the transit/destination node list 104. The serial number addition unit 105 further adds a serial number to each test packet. The transmission time counter 106 serves as the time base for the measurement of transmission times. The transmission time counter 106 initializes itself when a reset signal is given from the test ID addition unit 102. The function of the time correction unit 107 is to add a transmission time record to those test packets (or reference transmission time record for the reference test packet) as the final step in the test packet generation process. The test packets generated in this way are supplied to the label addition unit 108, where each packet is labeled according to the transit/destination node list 104. The ADM 109 is a block that provides both add and drop functions, allowing test packets to be sent out to the network.

The IP header reading unit 110 extracts IP header information from packets supplied from the router R when relaying ordinary packet traffic. The extracted information is used to retrieve an appropriate data entry from the transit/destination node list 104. The retrieved entry specifies a particular label-switched path that is suitable for delivery of IP packets. Based on this path specification, the label addition unit 108 assigns an appropriate label to the packets. The ADM 109 multiplexes those labeled packets into the network data stream.

Referring to the lower half of FIG. 3, the packet reception controller 120 has the following elements: an ADM 121, a label detector 122, a label remover 123, a test ID reading unit 124, a reception (RX) time counter 125, a reception time correction unit 126, a buffer 127, a transport time determination unit 128, and a result notification unit 129.

The ADM 121, a block that provides both add and drop functions, takes out packets from the network data stream. The label detector 122 finds a label in each packet supplied from the ADM 121. If the label agrees with the identifier of the node, the label remover 123 removes the label from the packet. If the packet is an ordinary packet, it is directed to the router R. If the packet is a test packet, it is supplied to the test ID reading unit 124. The test ID reading unit 124 examines each received test packet to read out its test ID. The reception time counter 125 serves as the time base for the measurement of reception time. The reception time counter 125 initializes itself when a reset signal is given from the test ID reading unit 124. The time correction unit 126 adds a reception time record to the received test packets (or reference reception time record to the reference test packet). The buffer 127 is temporary storage for the received test packets. The transport time determination unit 128 receives and evaluates each test packet from the buffer 127, comparing the transmission time difference with the reception time difference. By doing so, the transport time determination unit 128 determines which route takes more time. The result notification unit 129 notifies an external entity of the result of the packet route evaluation test.

As mentioned earlier, the destination node returns received test packets back to the source node. To do so, the destination node modifies each received test packet in such a way that it will include the source node ID, transit node IDs, and destination node ID for the return path. More specifically, the received source node ID is set to the destination node ID field, and the received destination node ID to the source node ID field. When the test packet contains a plurality of transit node IDs, the order of those IDs is reversed. For example, a series of transit node IDs<ID1, ID2, ... IDn-1, IDn> is rearranged to <IDn, IDn-1, ... ID2, ID1.>

Figure 4:
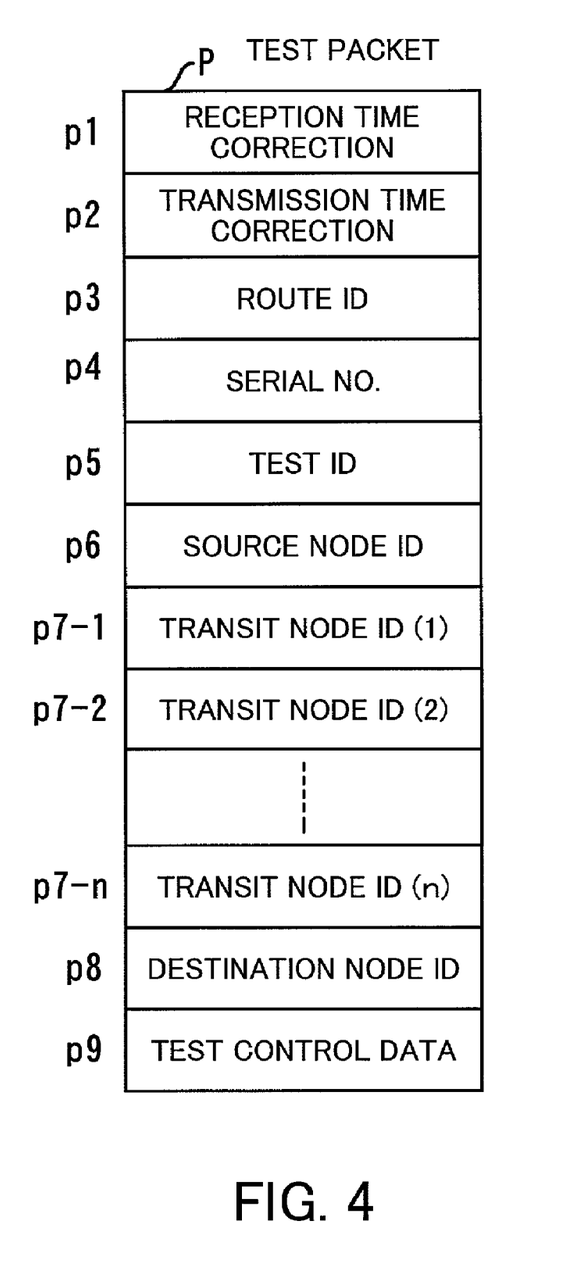
FIG. 4 shows the structure of a test packet.

FIG. 4 shows the structure of layer-2 test packets P used in the proposed communication device. As FIG. 4 shows, the test packet P has multiple data fields p1 to p9. Particularly, the data fields p1 to p5 and p9 are added for test purposes. The first field p1 is titled "Reception Time Correction," which holds the reception time record of this packet P relative to the first arrived packet. The second field p2 entitled "Transmission Time Correction" carries the transmission time of the test packet P relative to that of the reference test packet. The test packet P has a plurality of "Transit Node ID" fields p7-1 to p7-n to accommodate the identifiers of n intermediary nodes in the order that the packet P will pass through on the way to its destination. The eighth field p8, entitled "Destination Node ID," carries the identifier of the node to which the packet P is addressed. The ninth field p9 is called "Test Control" and contains a value that indicates whether the packet is a normal packet ("0") or a test packet ("1").

Figure 5:
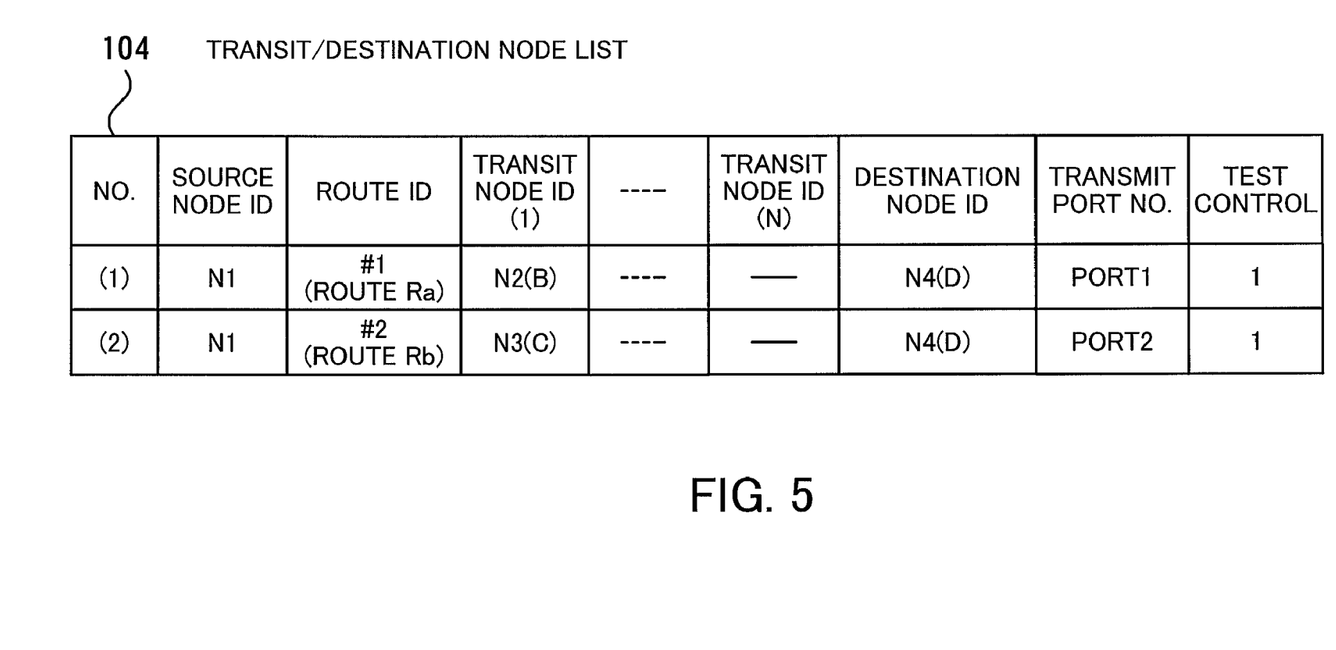
FIG. 5 shows the structure of a transit/destination node list.

Referring to FIG. 5, the structure of the transit/destination node list 104 is shown. Each entry of this transit/destination node list 104 comprises the following data fields: "Source Node ID," "Route ID," "Transit Node IDs" for nodes (1) to (n), "Destination Node ID," "Transmit Port No.," and "Test Control."

Figure 6:
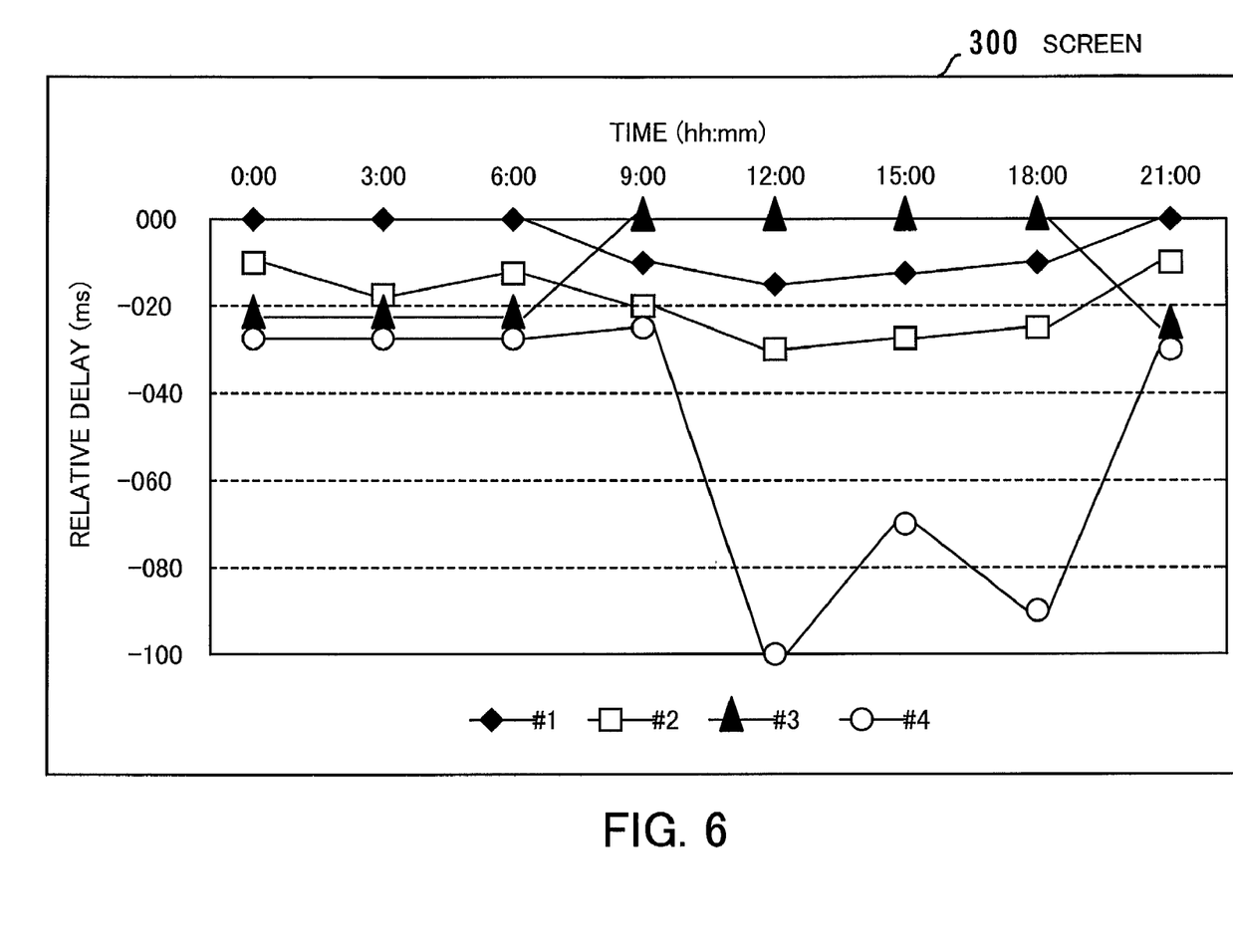
FIG. 6 shows a typical screen that the display controller produces on a maintenance console.

Referring lastly to FIG. 6, a function of the display controller 30 will be described below. FIG. 6 shows a typical screen that the display controller 30 outputs to the maintenance console. This screen 300 visualizes the result of a series of packet route evaluation tests carried out for four different routes designated by route IDs #1, #2, #3, and #4. The test was conducted eight times from 0:00 a.m. at intervals of three hours, as indicated on the horizontal axis of the graph. The screen 300 summarizes the test results.

The vertical axis of the graph represents the relative delay time of each route, i.e., the packet transport time of each route relative to that of the fastest route. The relative delay time corresponds to what has been explained as ($\Delta s - \Delta t$) in FIG. 2. See the first test result sampled at 0:00, for example. This plot shows that the route #1 exhibited the smallest delay of all and was followed by the routes #2, #3, and #4 in that order.

The test results shown in the screen 300 provides several implications as follows. First, the route #3 is ideal for business users who are likely to produce higher traffic during daytime hours, rather than in the nighttime. Second, the second fastest route #1 is suitable as a spare route for their traffic. Third, the routes #1 and #2 tend to suffer heavier traffic during the daytime, resulting in longer delay times. Fourth, the route #4 shows particularly high traffic loads. This situation necessitates some countermeasures to alleviate the loads, such as distributing the traffic to other paths, or allocating a greater bandwidth to the congested route #4.

The above discussion will now be summarized below. According to the present invention, the proposed communication device 1 is configured to determine the relationship between a plurality of network routes in terms of their packet transport times. By sending a special test packet to each route, it measures the transmission time difference and reception time difference for each test packet, and by evaluating those differences, it ranks the possible routes running between source and destination. Based on the evaluation test results, it chooses an appropriate route for delivery of packets. This feature of the present invention permits an optimal route to be selected from among those being available between a given source and destination nodes, thus contributing to the performance improvement in high-speed packet transport.

In addition, the evaluation test process yields the second and third fastest routes, which can be reserved as backup paths that would be used in case of a failure in the current active path. This feature makes the network more suitable for real-time communication services (e.g., voice and video).

Further, the proposed communication device conducts packet route evaluation tests on a regular basis, and displays the summarized test result on the monitor screen of a maintenance console. This feature contributes to more efficient network operations and maintenance, allowing the network operator to clearly understand the traffic condition in each time slot.

While the above explanation has assumed a label-switched IP packet network, it is not intended to limit the scope of the invention to this specific type of networks. Rather, the packet route evaluation test of the present invention can be applied to a wide range of networks.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A communication device which controls transmission of packets, comprising:
   (a) a transmission testing means for performing a packet route evaluation test, comprising:
   test packet generating means for generating a plurality of test packets, one for each route reaching a given destination node, the plurality of test packets including one reference test packet,
   transmission time acquisition means for recording reference transmission time at which the reference test packet is transmitted, and measuring transmission times of the other test packets to be transmitted, relative to the reference transmission time,
   reception time acquisition means for recording reference reception time at which the reference test packet is received, and measuring reception times of the other received test packets, relative to the reference reception time, and transport time evaluation means for ranking the plurality of routes in the order of relative packet transport times thereof, by evaluating the difference between the relative transmission time and the relative reception time of each test packet; and (b) packet transmission means for transmitting packets to one of the routes that is selected according to the result or the packet route evaluation test performed by said transmission testing means.

2. The communication device according to claim 1, wherein:

the plurality of routes are label-switched layer-2 paths that reach the destination node;

said transmission testing means evaluates each of the plurality of label-switched layer-2 paths in term of the relative packet transport times; and said packet transmission means transmits IP packets to one of the label-switched layer-2 paths that is selected according to the result of the packet route evaluation test.

3. The communication device according to claim 1 wherein;

said packet transmission means normally chooses the shortest route among the plurality of routes that exhibits the smallest relative packet transport time; and when a failure occurs in the shortest route, or when an excessive traffic increase is observed in the shortest route, said packet transmission means chooses the second shortest route from among the remaining routes as an alternative to the shortest route, and transmits packets to the alternative route.

4. The communication device according to claim 1, wherein:

a loopback path is formed for each route, such that the transmitted test packet will be returned from the destination node thereof;

said transmission testing means evaluates the relative packet transport time of each route at regular intervals by sending and receiving the test packets through the loopback paths; and each of the teat packets has a data field to carry the reference transmission time or the relative transmission time, and another data field to carry the reference reception time or the relative reception time.

5. The communication device according to claim 1, further comprising display control means for displaying a result of the packet route evaluation test performed by said transmission testing means.

\* \* \* \* \*